No. 652,396. Patented June 26, 1900.
L. D. LOVEKIN.
PIPE COUPLING.
(Application filed Jan. 25, 1900.)

(No Model.)

WITNESSES:
Arthur E. Paige.
F. Norman Dixon.

INVENTOR:
Luther D. Lovekin
by his attorney
Wm. C. Strawbridge

THE NORRIS PETERS CO., PHOTO-LITHO., WASHINGTON, D. C.

UNITED STATES PATENT OFFICE.

LUTHER D. LOVEKIN, OF PHILADELPHIA, PENNSYLVANIA, ASSIGNOR OF ONE-HALF TO THE WILLIAM CRAMP & SONS SHIP AND ENGINE BUILDING COMPANY, OF SAME PLACE.

PIPE-COUPLING.

SPECIFICATION forming part of Letters Patent No. 652,396, dated June 26, 1900.

Application filed January 25, 1900. Serial No. 2,750. (No model.)

*To all whom it may concern:*

Be it known that I, LUTHER D. LOVEKIN, a citizen of the United States, residing in the city and county of Philadelphia, in the State of Pennsylvania, have invented certain new and useful Improvements in Pipe-Couplings, of which the following is a specification.

My invention relates especially, although not restrictively, to the coupling mechanism employed in connection with thin walled copper, steel, or other pipes, in which coupling rings structurally independent of the pipes are mounted one upon each of adjacent pipe sections and behind flanges or flaring mouths formed in the latter, which flanges engage against, and usually in circumferential recesses formed in, the inner faces of the respective coupling rings, the arrangement being such that said coupling rings may be drawn together and secured so as to clamp tightly between their opposing faces a packing of any desired character and retain the ends of the pipe sections in close proximity to each other.

The engagement of the flanges of the pipes against the inner faces of the respective coupling rings secures said pipes firmly in the position to which they are brought by the binding together of said rings.

My invention aims to provide a simple, compact, and inexpensive arrangement of coupling rings of such construction and arrangement that a very close and tight joint between the coupling rings is formed apart from the packing material which may be dispensed with.

As a result of my improved arrangement the number of parts entering into the formation of the union is diminished, and in the disuse of packing material the possibility of its misplacement or improper distribution resulting in defective joints as well as the possibility of leakage resulting from the packing becoming dead are avoided.

My invention comprehends the provision of a pair of coupling rings one of which is provided on its inner face with one or a series of circumferential or annular ribs or ridges, which, in the drawing together of the rings, encounter the plane inner face of the other coupling ring, and are by said ring, under the pressure to which the rings are subjected, slightly flattened or depressed as to their crests against such plane face.

In the accompanying drawings I show, and herein I describe, a good form of a convenient embodiment of my invention, the particular subject-matter claimed as novel being hereinafter definitely specified.

In the accompanying drwaings,

Similar letters of reference indicate corresponding parts.

In the drawings.

Figure 1:
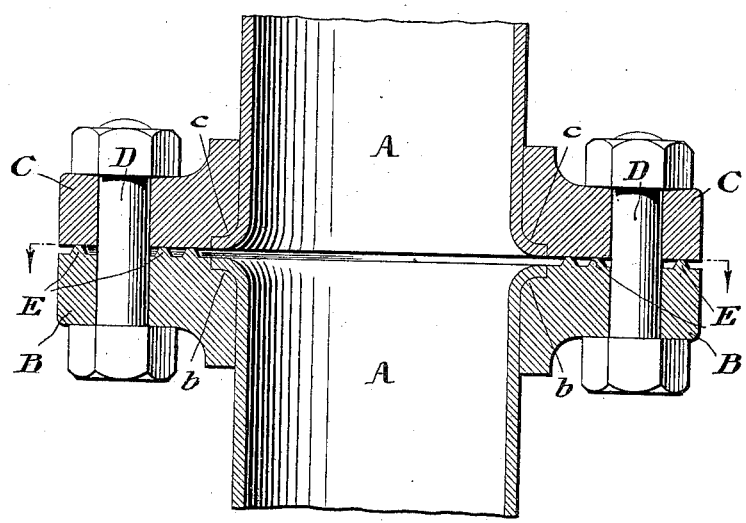
Figure 1 is a longitudinal central section of a pipe coupling embodying my invention shown as employed in connection with the meeting ends of two adjacent pipe sections.
Figure 2:
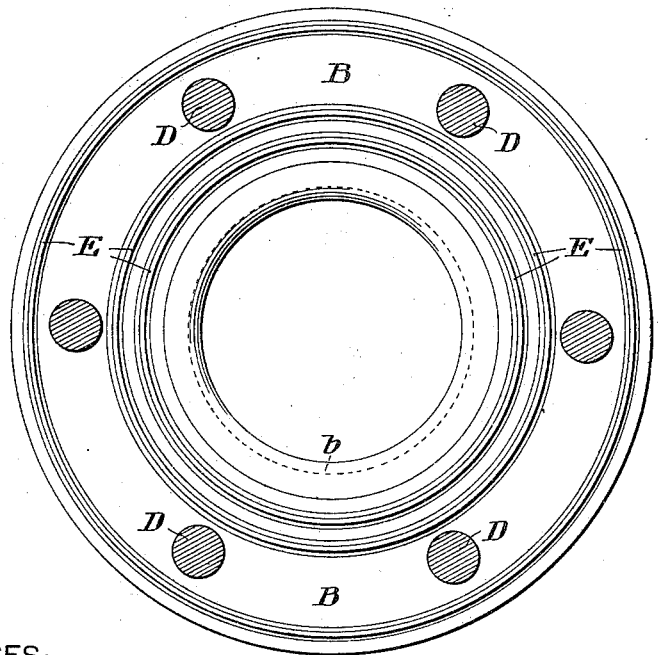
Figure 2 is a view in face elevation of the rib provided coupling ring.

A A are two adjacent pipe sections the meeting ends of which are turned or flanged outward as shown.

B C are a pair of coupling rings, one mounted upon each of said pipe sections, and provided with recesses $b$ $c$ respectively, for the reception of the outwardly turned lips or flanges of the pipes.

When the lips of the pipes are within said recesses the faces of said lips are as shown flush with the inner faces of the respective rings.

D are a series of bolts passing through openings of suitable character formed in both rings, and provided with nuts, by the tightening up of which the rings are forced or drawn strongly together.

In the construction shown in the drawings, the coupling member B is equipped with a series of three circumferential ribs, E, integral with its substance, located upon, and projecting a uniform distance from or above its inner face.

These ribs, of which one or any desired plurality may be employed, are preferably of tapered section, as shown, and slightly flattened as to their crests. The opposing face of the other ring is shown as plane or flat.

The coupling rings may not only be made of any suitable metal, but are also frequently formed of compounds of metallic elements, and vary widely in composition. Tin, copper, and zinc, have usually entered largely into the formation of the rings and they are, therefore, slightly malleable.

Under the compression imparted by the tightening up of the nuts upon the bolts, the plane face of one ring, bearing upon the crest or crests of the rib or ribs of the other, presses so tightly against the same as to slightly flatten said crest or crests, not only broadening it or them and thus increasing the area of its or their contacting face but causing said contacting face to conform precisely and absolutely to the corresponding region of the plane coupling ring including all the minute irregularities thereof.

The crest or crests of the rib or ribs are so to speak molded or shaped under compression into such an absolute conformation to the plane surface of the coupling-ring forced against them that a very close joint is made.

The character of this joint, being wholly metallic, is such that, as is obvious, it is not affected by lapse of time, and it is, therefore, especially desirable where a permanent union is formed.

When, for any purpose, the pipes are separated and drawn together again, a re-adjustment of the rib crest takes place, the crest being as to its upper or contacting surface automatically so to speak molded or shaped anew to conform to the portions of the plane member with which it is brought into contact in the replacing of the rings.

The rib is conveniently formed in one and the same formative operation as the body of the coupling ring with which it is integral.

Having thus described my invention, I claim—

In combination, pipe sections, a pair of coupling rings structurally independent of the pipe sections one of which rings is formed of malleable or slightly compressible metal, or composition, which rings are mounted one on each of said sections, said ring formed of malleable or slightly compressible metal or composition having on its inner face a circumferential rib formed integral with its substance, and the other ring having on its inner face a plane region corresponding in position to said rib, means for engaging said pipe sections with said rings, and means for drawing said rings or sections together, substantially as set forth.

In testimony that I claim the foregoing as my invention I have hereunto signed my name this 23d day of January, A. D. 1900.

LUTHER D. LOVEKIN.

In presence of—
F. NORMAN DIXON,
THOS. K. LANCASTER.